UNITED STATES PATENT OFFICE.

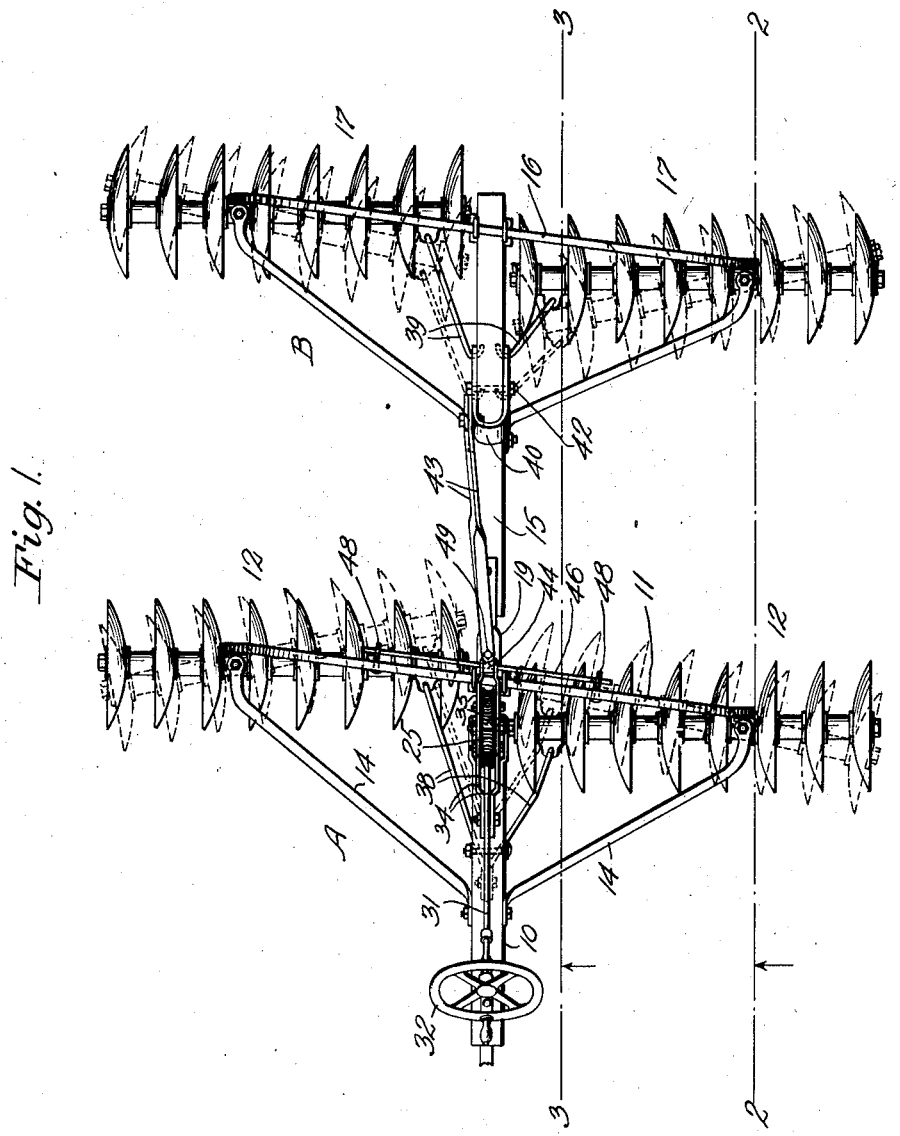

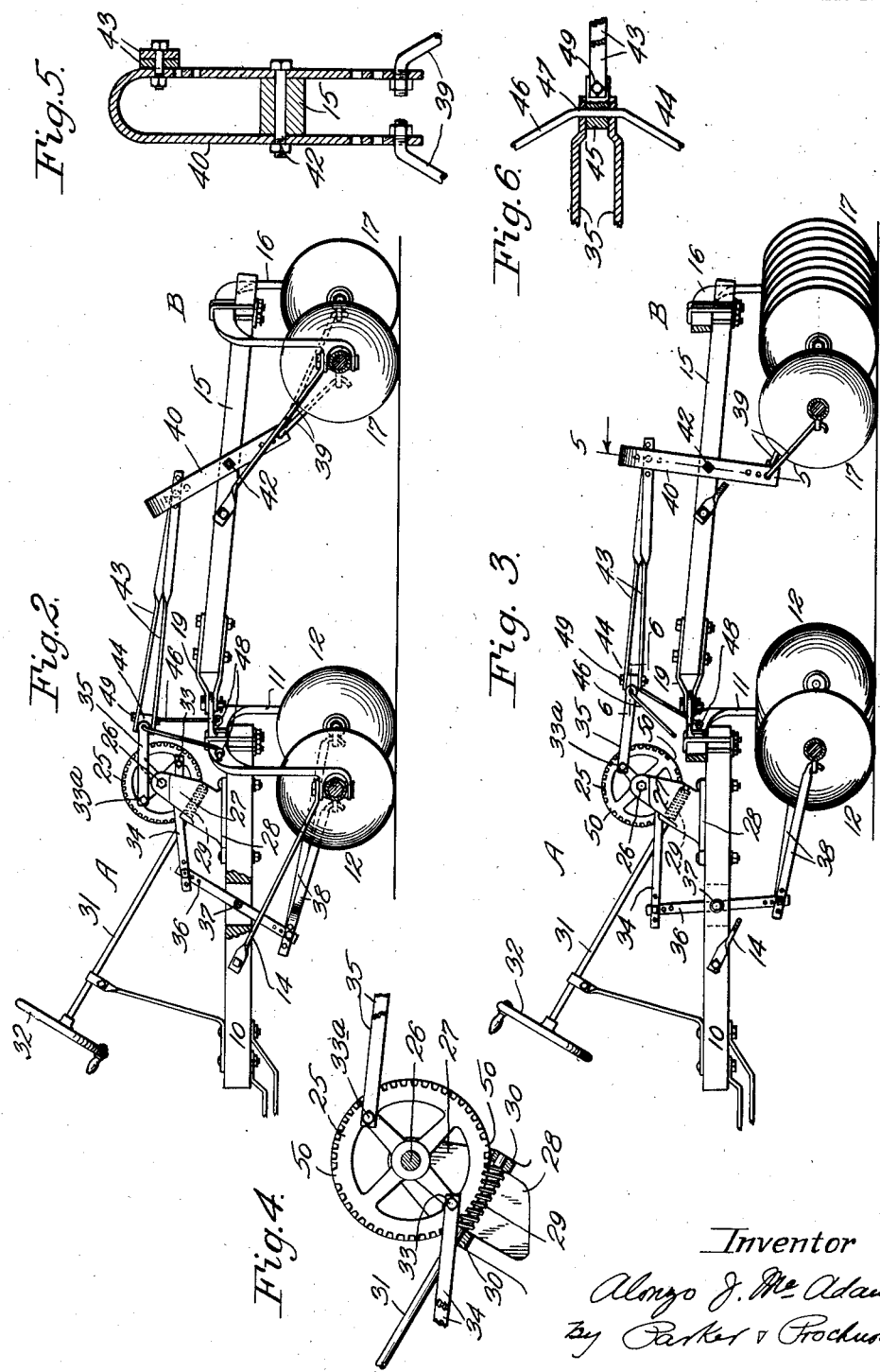

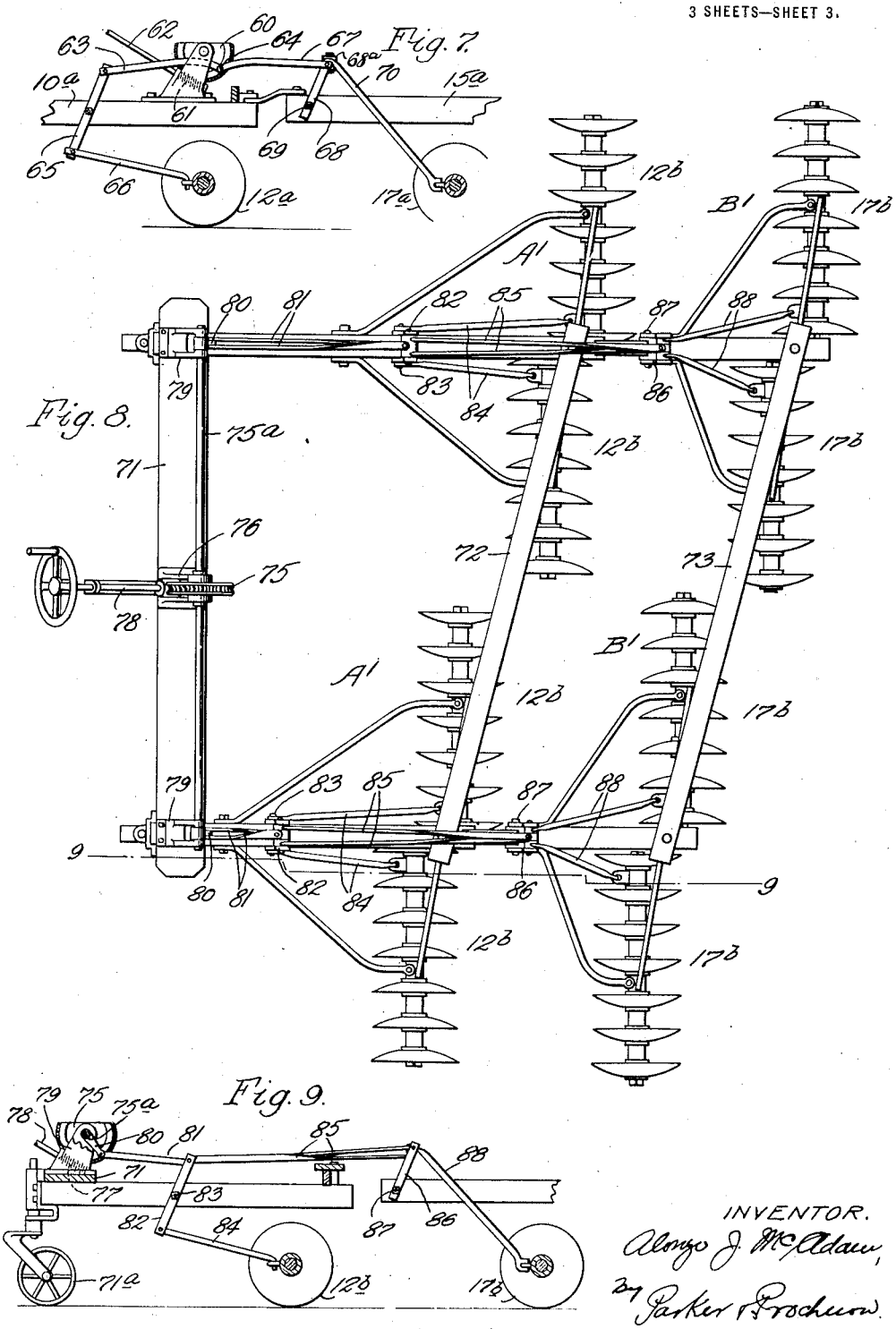

ALONZO J. McADAM, OF BARKER, NEW YORK.

DISK HARROW AND ANALOGOUS MACHINE.

1,364,943.  Specification of Letters Patent.  Patented Jan. 11, 1921.

Application filed September 26, 1919. Serial No. 326,532.

*To all whom it may concern:*

Be it known that I, ALONZO J. McADAM, a citizen of the United States, residing at Barker, in the county of Niagara and State of New York, have invented a new and useful Improvement in Disk Harrows and Analogous Machines, of which the following is a specification.

This invention relates to improvements in tandem disk harrows or analogous tilling machines of that type wherein two or multiples of two harrows, each having a plurality of disk or implement gangs, are arranged one behind the other, the rear harrow or harrows having a flexible draft connection with the forward harrow or harrows. More particularly the invention relates to operating means whereby the disk or implement gangs of the forward and rear harrows can be simultaneously actuated from a position at the front of the forward harrow or harrows to change the angle of the gangs relatively to the line of draft, or place the gangs "into cut" or "out of cut," so that the driver of the tractor for the harrows can readily and conveniently adjust the gangs without leaving his seat or place on the tractor and without stopping the tractor.

As ordinarily arranged, for example, in a two unit harrow, the gangs of the forward harrow are adapted, when in operative position to assume an "out throw" position, while the gangs of the rear harrow assume an "in throw" position. In tilling fields wherein soil conditions vary, it is necessary to frequently change the angularity of the gangs, for instance when going through a sandy spot the gangs are thrown "out of cut" to lighten the draft, and are thrown "into cut" again as soon as the sandy spot is passed. To be effective, the gang-operating means must be capable of quick and easy operation, and be strong and powerful in action.

The objects of the invention are to provide an efficient and desirable gang-operating mechanism of simple and inexpensive construction capable of accomplishing the above results, and to improve the gang-operating mechanisms of tandem tilling machines in the other respects herein described and set forth in the claims.

In the accompanying drawings:

Figure 1 is a plan view of a tandem disk harrow provided with means embodying the invention for simultaneously actuating the disk gangs of both harrows from the front of the forward harrow.

Fig. 2 is a longitudinal sectional elevation thereof on line 2—2, Fig. 1.

Fig. 3 is a similar view therof on line 3—3, Fig. 1, with the gangs in "extreme cut" position.

Fig. 4 is a fragmentary sectional elevation of the worm and worm wheel of the actuating device.

Fig. 5 is a transverse sectional elevation, on an enlarged scale, on line 5—5, Fig. 3.

Fig. 6 is a sectional plan view, on an enlarged scale, of the universal joint connection between the forward and rear elements of the actuating device, taken on line 6—6, Fig. 3.

Fig. 7 is a fragmentary longitudinal sectional elevation showing a slightly modified form of actuating mechanism for simultaneously operating the disk gangs of the harrows.

Fig. 8 is a plan view of a double tandem or four unit machine, equipped with disk gang actuating means similar to that shown in Fig. 7.

Fig. 9 is a fragmentary longitudinal sectional elevation thereof on line 9—9, Fig. 8.

The tandem disk harrow shown in Figs. 1-6 of the drawings comprises a forward harrow A and a rear harrow B. The harrow A includes, as usual, a longitudinal draft beam or member 10, a transverse beam 11 rigidly secured to the rear end of the draft member and to each end of which is pivoted a disk gang 12. These gangs are pivoted between their ends, and their inner ends are connected to the actuating device whereby they are swung to and from a perpendicular position relative to the draft member 10. 14 represents braces of any suitable sort connecting the ends of the transverse beam 11 with the draft beam 10. The draft beam 10 is provided at its front end with a suitable device for connecting the tandem disk harrow to a tractor.

The rear harrow B (shown) is of similar construction to the harrow A and comprises a draft beam or member 15, transverse beam 16 and disk gangs 17 pivoted to the opposite ends of the transverse beam and connected to the operating device. The front end of the draft beam 15 of the rear harrow is connected to the rear end of the draft beam 10 of the front harrow by a suitable clevis or device 19 to permit relative, swinging movements between the front and rear harrows A and B.

The tandem disk harrow as thus far described is of known construction and of itself forms no part of the invention. It can be of any suitable construction.

The operating mechanism for simultaneously actuating the disk gangs 12 and 17 of the forward and rear harrows A and B is preferably constructed as follows (see Figs. 1–6):

A worm wheel 25 is suitably journaled preferably on the draft beam 10 of the forward harrow, preferably by a transverse shaft or axle 26, bearing in lugs 27 of a bearing bracket 28 secured on the draft beam 10 of the forward harrow A, and this worm wheel is adapted to be rotated by a worm 29 suitably journaled preferably in inclined bearings 30 in the bracket 28. A forwardly and upwardly extending shaft 31 provided at its front end with a hand wheel 32, or other device for turning it, and connected to the worm 29, provides means for turning the worm. Suitably pivoted at 33 and 33ª at diametrically opposite points on the worm wheel and adjacent its periphery, are forwardly and rearwardly extending links 34 and 35 respectively. Each of these links, as shown in the drawings, consists of two bars arranged on the opposite sides of the worm wheel. The forwardly extending link 34 is pivotally connected at its front end to the upper end of a lever 36, fulcrumed between its ends at 37, preferably in a longitudinal, vertical slot in the draft beam 10. The lower end of the lever 36 is connected, preferably by links 38, to the inner ends of the forward gangs 12, so that any forward or rearward motion imparted to the upper end of the lever 36, by turning the worm wheel 25, will cause a corresponding movement in the opposite direction to the inner ends of the disk gangs 12.

For simultaneously imparting an equal but opposite movement to the disk gangs 17 of the rear harrow B, the worm wheel 25 is connected thereto, preferably as follows:

Links 39 connected to the inner ends of the rear disk gangs 17 extend forwardly therefrom and are pivotally connected to the lower ends of the legs of a U-shaped lever 40 which straddles the rear draft beam 15 and is pivoted between its ends thereon at 42, (see Figs. 2, 3 and 5). A pair of forwardly-extending links 43 is pivoted to the upper end of the lever 40 at a distance above its fulcrum equal to the distance between said fulcrum and the pivotal connection of the lever with the links 39. The links 43 are connected by a universal joint 44 to the rear ends of the link 35.

The universal joint 44 is for the purpose of permitting relative, vertical and lateral movements between the forward and rear elements of the disk gang operating device, as the harrow B moves and swings on the clevis or device 19 and to prevent binding of the parts when actuated by the worm wheel. This universal joint 44 as shown, is constructed in the following manner (see Fig. 6):

A block 45 is provided between the rear ends of the links 35 by a bent rod or bail 46 having a middle portion 47 which passes horizontally through the block and through holes in the ends of the links, and opposite legs which diverge downwardly and are pivoted at their lower ends by means of eye bolts 48, or otherwise, to the transverse beam 11 at opposite sides of the draft beam 10. The forward ends of the links 43 are connected to the block 45 by a vertical pivot or bolt 49. Thus the adjacent ends of the links 35, 43, can move without binding when actuated by the worm wheel irrespective of the vertical and transverse relation of the two harrows A and B.

If desired, the periphery of the worm wheel 25 may be provided with oppositely disposed stops 50 to prevent the possibility of rotating the wheel too far.

The operation of the device is as follows:—

Assuming the harrows A and B of the tandem disk harrow to be in the "out of cut" position, as shown in full lines in Figs. 1 and 2, and it is desired to simultaneously throw the disk gangs of the two harrows into "extreme cut," as shown in Fig. 3, the hand wheel 32 is turned to rotate the worm wheel 25 in a clockwise direction by means of the worm 29. The pivots 33, 33ª will then move forwardly and rearwardly respectively, and the lever 36 will be actuated by the links 34, to force the links 38 and forward disk gangs 12 rearwardly "into cut" and at the same time the links 35, 43 will actuate the lever 40 to draw the links 39 and rear disk gangs 17 forwardly "into cut" to the same extent. By rotating the worm wheel in the opposite direction the disk gangs may be placed in "out of cut" position.

The pivotal connections of the various links with the levers 36 and 40 are all preferably located at the same distance from the lever pivots, so that an equal adjustment of both sets of disk gangs is obtained at all times.

The gang operating mechanism shown in Fig. 7 includes a mutilated worm wheel 60 and worm 61 operated by a shaft 62, as before. A link 63 pivotally connected at 64 to the worm wheel, extends forwardly and is connected to the upper end of a lever 65 fulcrumed between its ends to the draft beam 10ª. The lower end of the lever 65 is connected by two rods or links 66 (one of which is shown) to the inner ends of the two forward gangs 12ª. A rearwardly extending link 67 is also pivotally connected to the worm wheel 60, preferably by the same pivot 64, used for the link 63, and has its rear end pivotally connected to the upper end of a swinging support or lever 68, the lower end of which is pivoted at 69 on the forward end of the rear draft beam 15ª. A suitable universal joint or flexible connection 68ª is supported at the upper end of the lever 68 and joins the link 67 to the front ends of two links 70 (only one of which is shown) and to the lever 68. The rear ends of the links 70 are pivoted to the inner ends of the two rear disk gangs 17ª. Consequently, the rotation of the worm wheel 60, for instance to the left in Fig. 7, will impart a rearward movement to the forward disk gangs 12ª and simultaneously a forward movement to the rear disk gangs 17ª, as will be apparent.

In Figs. 8 and 9 of the drawings a double tandem or four unit machine is shown, preferably comprising two tandem disk harrows substantially as before described, and each including front and rear disk harrows A' and B'. The tandem disk harrows may be operatively connected together in any usual or suitable manner. As shown in the drawings a spreader bar 71 supported by caster wheels 71ª and constituting a fore truck, is pivotally connected to the front ends of the forward draft beams and additional spreader bars 72, 73, are pivotally connected respectively to the rear ends of the forward and rear draft beams for the purpose of keeping the two tandem disk harrows a proper distance apart and permitting them to swing relatively to each other when turning around.

The mechanism for simultaneously actuating the front and rear disk gangs 12ᵇ and 17ᵇ respectively, of both tandem harrows is preferably constructed as follows:

A mutilated worm wheel 75 is mounted at the central portion of the front spreader or fore truck 71 on a shaft 75ª which is journaled on a suitable bracket 76, and a worm 77 having an operating shaft 78 is provided for rotating it. The shaft 75ª of the worm wheel 75 is extended laterally and has its opposite ends journaled in brackets 79 on the spreader 71, and preferably in line with the front draft beams of the harrows A' A'. To the opposite ends of the shaft 75ª are rigidly secured rock arms 80 to which are pivotally connected rearwardly extending links 81. The rear ends of the links 81 are pivoted to levers 82, fulcrumed between their ends at 83 on the draft beams of the two front harrows A' A', the lower end of each lever 82 being connected by means of two links or rods 84 to the inner ends of the two disk gangs of each front harrow. The upper ends of the levers 82 are connected by the links 85 to swinging supports or levers 86 pivoted at 87 on the draft beams of the two rear harrows B' B', and the links 88 also connect the upper ends of the swinging supports or levers 86 to the inner ends of the several rear disk gangs. Suitable universal joints or flexible connections are preferably provided at the upper ends of the levers 82 and 86 for the link connections to permit relative movements between the different harrows as before explained.

The described mechanism, of whichever construction employed, forms a simple and powerful means for operating the disk gangs as stated, and requires relatively few turns of the hand wheel to move the disk gangs from one extreme position to the other, so that the operative on the tractor will be enabled to easily and quickly adapt the tandem disk harrow to varying soil conditions without leaving his place on, or stopping the tractor.

I claim as my invention:

1. The combination with tilling machines arranged one in front of the other and flexibly connected, each having gang implements adjustable relatively to the line of draft, of a lever pivoted on each of said machines, an actuating wheel on one of said machines, means for rotating said wheel, connections between said wheel and said levers, and connections between said levers and said gangs whereby all of said gangs may be simultaneously adjusted by rotating said wheel.

2. The combination with tilling machines arranged one in front of the other and flexibly connected, each having gang implements adjustable relatively to the line of draft, of a lever pivoted on each of said machines, a worm wheel on one of said machines, a worm for rotating said worm wheel, and means connecting said levers to said worm wheel and to said gangs whereby said gangs may be adjusted by rotating said worm and worm wheel.

3. The combination with tilling machines arranged one in front of the other and flexibly connected, each having a plurality of implement gangs adjustable relatively to the line of draft, of a worm wheel journaled adjacent the front machine, a worm for rotating said worm wheel, and connections from said worm wheel to the several implement gangs whereby all of said gangs are simultaneously adjusted by the rotation of said worm, said connections being constructed to produce opposite adjustments of the gangs on different machines.

4. In a tandem tilling machine, the combination with tilling machine units arranged one in advance of the other and flexibly connected, each unit having gang implements adjustable relatively to the line of draft, of a worm wheel rotatably supported adjacent the front end of said tandem tilling machine, a worm for rotating said worm wheel, and connections from said worm wheel to the several implement gangs of said tilling machine units whereby all of said gangs are simultaneously adjusted by the rotation of said worm.

5. The combination with tilling machines arranged one in front of the other and flexibly connected, each having gang implements adjustable relatively to the line of draft, of levers pivoted on said machines, an actuating wheel on one of said machines, means for rotating said wheel, a link pivotally connecting one end of one of said levers to said wheel, links connecting the other end of said lever to the gang implements of said front tilling machine, rearwardly extending links flexibly connected to each other, and connected to said wheel and to said implement gangs of the rear machine and supported by said other lever, whereby all of said gangs may be simultaneously adjusted by rotating said wheel.

6. In a tandem tilling machine, the combination with tilling machine units arranged one in advance of the other and flexibly connected, each having a plurality of implement gangs adjustable relatively to the line of draft, of a worm wheel rotatably supported adjacent the front end of said tandem tilling machine, a worm for rotating said worm wheel, and connections from said worm wheel to the several implement gangs whereby all of said gangs are simultaneously adjusted by the rotation of said worm, said connections being constructed to produce opposite adjustments of the gangs on different machines.

Witness my hand this 24th day of September, 1919.

ALONZO J. McADAM.

Witnesses:
C. W. PARKER,
A. L. McGEE.